UNITED STATES PATENT OFFICE.

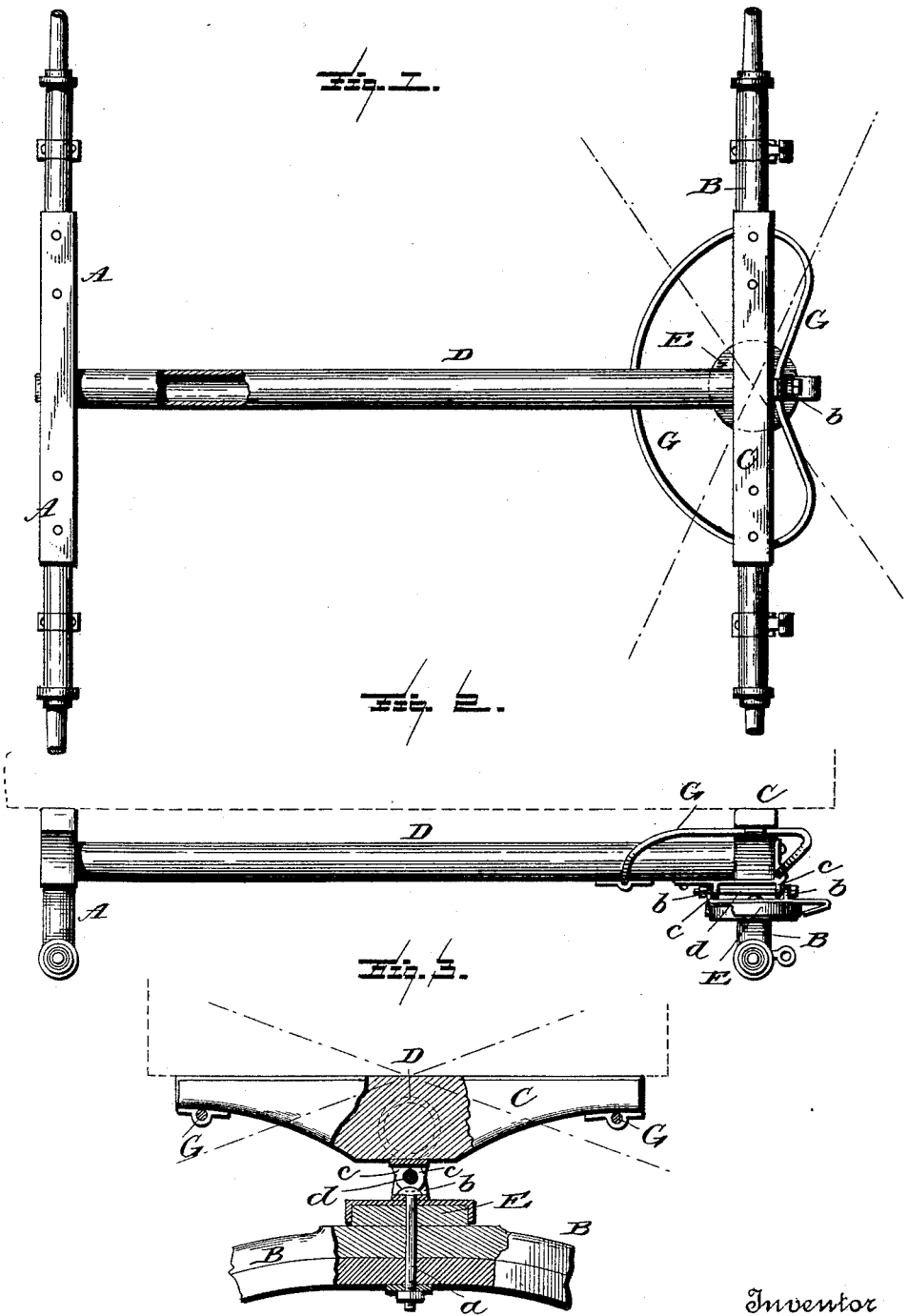

WILLIAM DUDLEY MAYFIELD, OF FORT WORTH, TEXAS.

RUNNING-GEAR.

SPECIFICATION forming part of Letters Patent No. 435,847, dated September 2, 1890.

Application filed April 17, 1890. Serial No. 348,378. (No model.)

*To all whom it may concern:*

Be it known that I, WILLIAM DUDLEY MAYFIELD, a citizen of the United States, residing at Fort Worth, in the county of Tarrant and State of Texas, have invented certain new and useful Improvements in Running-Gears; and I do hereby declare that the following is a full, clear, and exact description of the same, reference being had to the annexed drawings, making a part of this specification, and to the letters of reference marked thereon.

This invention relates to certain new and useful improvements in running-gear for buggies; and it has for its object to improve upon prior devices of this character, to provide a running-gear in which all of the twisting strain will be taken off of the fifth-wheel, and relieve the bed of all strain in consequence of the wheels passing over uneven ground. The bed is entirely controlled by the hind wheels and is freed from all twisting. I employ a tubular coupling which is not liable to be twisted; consequently the bed is saved from being racked and damaged.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a top plan illustrating my invention. Fig. 2 is a side elevation of the same. Fig. 3 is an end elevation with parts in section and parts broken away.

Like letters of reference indicate like parts throughout the several views.

Referring now to the details of the drawings by letter, A designates the rear axle and B the front axle.

C is a head-block which is connected with the rear axle by means of the tubular coupling D in any suitable manner.

E is the fifth-wheel, connected with the front axle by means of the vertical bolt $a$ in such a manner as to allow the axle to turn in a horizontal plane, as indicated by the dotted lines in Fig. 1. The upper portion of the fifth-wheel has lugs $b$, and on the under side of the tubular coupling there are ears $c$, and through these ears there passes loosely a connecting pin or bolt $d$, which serves to connect the coupling and fifth-wheel in such a manner as to allow the head-block to turn in a vertical plane, as indicated by the dotted lines in Fig. 3. It will thus be seen that the fifth-wheel is free to work smoothly in all the requisite directions without any strain being thrown upon it in case the wheels should run into a rut or over uneven ground. The tubular coupling cannot be twisted, and consequently the bed is saved from being racked and damaged. The bed is entirely controlled by the hind wheels, and is thus free from all twisting, because the necessary strain is not sufficient to twist the coupling.

G is a wire guard attached to the ends of the head-block, upon the under side thereof, and to the under side of the coupling, as shown, and bent around upon the arc of a circle to the rear of the head-block, and at its forward portion bent inwardly, as shown, and secured to the descending portion of the connection between the head-block and coupling, as seen best in Fig. 2. This serves to limit the rocking motion of the head-block by coming in contact with the axle, and also serves as a guide in the turning of the head-block.

What I claim as new is—

1. The combination, with the swiveled fifth-wheel and the hinged head-block and the front axle, of the rear axle, the tubular coupling, and the guard attached to the head-block and coupling and adapted to engage the front axle to limit the movement of the head-block, substantially as specified.

2. The combination, with the front and rear axles, of the tubular connection, the connection between the tubular coupling and the head-block, formed with ears, the swiveled fifth-wheel carrying ears, the connecting-pin held in said ears, and the guard attached to the ends of the head-block, to the under side of the tubular coupling, and to the connection between the coupling and the head-block at the forward end thereof, substantially as shown and described.

In testimony that I claim the above I have hereunto subscribed my name in the presence of two witnesses.

WILLIAM DUDLEY MAYFIELD.

Witnesses:
N. R. BOWLIN,
C. R. BOWLIN.